(12) United States Patent
Gordon, III et al.

(10) Patent No.: US 7,294,672 B2
(45) Date of Patent: Nov. 13, 2007

(54) METHOD TO FORM POLYMERIC MATERIALS BY REVERSE SUSPENSION/EMULSION POLYMERIZATION AND COMPOSITIONS FORMED USING THAT METHOD

(75) Inventors: Bernard Gordon, III, Tucson, AZ (US); Jim DiBattista, Tucson, AZ (US)

(73) Assignee: Polymer Chemistry Innovations, Inc., Tucson, AZ (US)

( * ) Notice: Subject to any disclaimer, the term of this patent is extended or adjusted under 35 U.S.C. 154(b) by 591 days.

(21) Appl. No.: 10/815,434

(22) Filed: Mar. 31, 2004

(65) Prior Publication Data

US 2004/0192837 A1    Sep. 30, 2004

(51) Int. Cl.
*C08G 63/00* (2006.01)

(52) U.S. Cl. ............... 524/773; 528/274; 528/312; 528/336

(58) Field of Classification Search ........... 524/773; 528/274, 312, 336
See application file for complete search history.

(56) References Cited

U.S. PATENT DOCUMENTS

| | | | |
|---|---|---|---|
| 3,393,252 A * | 7/1968 | Zimmerman | ............ 525/432 |
| 4,560,653 A | 12/1985 | Sherwin | |
| 5,371,180 A | 12/1994 | Groth et al. | |
| 5,541,090 A | 7/1996 | Sakano et al. | |
| 5,548,036 A | 8/1996 | Kroner et al. | |
| 5,639,832 A | 6/1997 | Kroner et al. | |
| 5,741,681 A | 4/1998 | Kato et al. | |
| 5,872,285 A | 2/1999 | Mazo et al. | |
| 5,902,357 A | 5/1999 | Riegels et al. | |
| 5,936,121 A | 8/1999 | Gelosa et al. | |
| 5,955,549 A | 9/1999 | Chang et al. | |
| 5,981,691 A | 11/1999 | Sikes | |
| 6,027,804 A | 2/2000 | Chou et al. | |
| 6,355,771 B1 | 3/2002 | Oda | |
| 6,495,658 B2 | 12/2002 | Sikes et al. | |
| 6,969,750 B2 * | 11/2005 | Tanaka et al. | ............ 526/262 |

FOREIGN PATENT DOCUMENTS

JP        8277329        10/1996

OTHER PUBLICATIONS

Harada, "Polycondesation of Thermal Precursors of Aspartic Acid", Journal of Organic Chemistry 24, 1959, pp. 1662-1666.

* cited by examiner

*Primary Examiner*—Edward J. Cain
(74) *Attorney, Agent, or Firm*—Chandler & Udall, LLP; Dale F. Regelman

(57) ABSTRACT

A method to form a polymeric material is disclosed. The method provides a water immiscible solvent and one or more condensation monomers, where those one or more condensation monomers are essentially insoluble in the water immiscible solvent. The one or more condensation monomers may be either a solid or a liquid at room temperature. The method forms a reaction mixture comprising a suspension of one or more solid condensation monomers, or an emulsion of one or more liquid condensation monomers, in the water immiscible solvent. The method includes heating the reaction mixture to form the polymeric material product. That polymeric material is then separated from said reaction mixture.

8 Claims, No Drawings

METHOD TO FORM POLYMERIC MATERIALS BY REVERSE SUSPENSION/EMULSION POLYMERIZATION AND COMPOSITIONS FORMED USING THAT METHOD

FIELD OF THE INVENTION

The invention relates to a method to form polymeric materials using a reverse suspension, or a reverse emulsion, polymerization. The invention further relates to compositions of matter formed using Applicants' method.

BACKGROUND OF THE INVENTION

As a general matter, prior art emulsion polymerizations utilize a chain growth mechanism, wherein an initiator adds to a monomer to form a reactive end group which then reacts with another monomer molecule. Additional monomer units are added to the reactive end group until some termination reaction takes place wherein the reactive end group is quenched. One or more monomers and one or more surfactants are dispersed in an aqueous medium. Sufficient levels of surfactants are employed to reach a critical micelle concentration (CMC).

Prior art emulsion polymerization methods are generally not suitable for step growth polymerizations using one or more condensation monomers. By "condensation monomer," Applicants mean a first monomer which reacts either with another first monomer, or with a second monomer, to liberate water as a reaction product. Step growth polymerizations include formation of a polyester using a mixture of a di-acid monomer and a di-ol monomer, or a monomer comprising both an acid group and an alcoholic group. Similarly, polyamides can be formed using a mixture of a di-acid monomer and a di-amine monomer, or a single monomer comprising an acid group and an amino group, i.e. an amino acid.

In such a step growth polymerizations, an acid group on a first monomer reacts with, for example, an alcohol/amine group disposed on a second monomer to liberate water and form an ester/amide linkage, respectively, interconnecting the first monomer with the second monomer. The process is repeated, and the molecular weight of the reaction product increases.

As a further general matter, prior art emulsion polymerization methods are virtually always initiated using a free radical. Anionic or cationic reactive chain ends would be rapidly quenched by the aqueous solvent.

Using prior art emulsion polymerization methods, the interior of each micelle provides the site necessary for polymerization. A monomer, such as for example styrene or methyl methacrylate, and a water soluble free radical initiator are added and the reaction mixture is agitated. The product of such an emulsion polymerization is sometimes referred as a "latex."

In the reaction mixture, the monomer(s) can be found in three different places. Those one or more monomers may be disposed in large monomer droplets disposed in the aqueous solvent. Some of the monomer, albeit very little, may be dissolved in the water. Lastly, the one or more monomers may be found in micelles.

Initiation takes place when an initiator fragment migrates into a micelle and reacts with a monomer molecule. Water soluble initiators, such as peroxides and persulfates, are commonly used to, inter alia, prevent polymerization in the big monomer droplets. Once polymerization starts, the micelle is referred to as a particle. Polymer particles can grow to extremely high molecular weights, especially if the initiator concentration is low. That makes the radical concentration and the rate of termination low as well. Sometimes a chain transfer agent is added to the mix to keep the molecular weight from getting too high.

Monomer migrates from the large monomer droplets to the micelles to sustain polymerization. On average, there is one radical per micelle. Because of this, there isn't much competition for monomer between the growing chains in the particles, so they grow to nearly identical molecular weights and the polydispersity is very close to one. Practically all the monomer is consumed in emulsion polymerizations, meaning the latex can be used without purification. This is important for paints and coatings.

Each micelle can be considered as a mini bulk polymerization. Unlike traditional bulk polymerizations there is no unreacted monomer leftover, and no thermal "hot spots" form. In bulk polymerizations, thermal hot spots cause degradation and discoloration and chain transfer broadens the molecular weight distribution.

What is needed is a method to polymerize one or more condensation monomers, where those condensation monomers are dispersed in a non-aqueous solvent system, and where those one or more condensation monomers are essentially insoluble in that non-aqueous solvent system.

SUMMARY OF THE INVENTION

Applicants' invention includes a method to form a polymeric material. The method provides a water immiscible solvent and one or more condensation monomers, wherein those one or more condensation monomers are essentially insoluble in the water immiscible solvent. The one or more condensation monomers may be either a solid or a liquid at room temperature.

The method forms a reaction mixture comprising a suspension of one or more solid condensation monomers, or an emulsion of one or more liquid condensation monomers, in the water immiscible solvent. The method includes heating the reaction mixture to form the polymeric material product. That polymeric material is then separated from said reaction mixture.

DETAILED DESCRIPTION OF THE PREFERRED EMBODIMENTS

A wide variety of polymeric materials can be formed using Applicants' reverse suspension and/or emulsion polymerization method. For example, in certain embodiments Applicants' method is used to prepare polyamides and/or polyamideimides using the chemistry illustrated below in reaction pathway I.

REACTION PATHWAY I

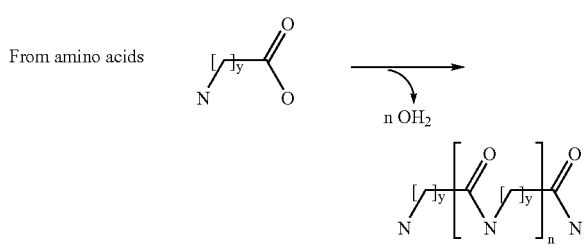

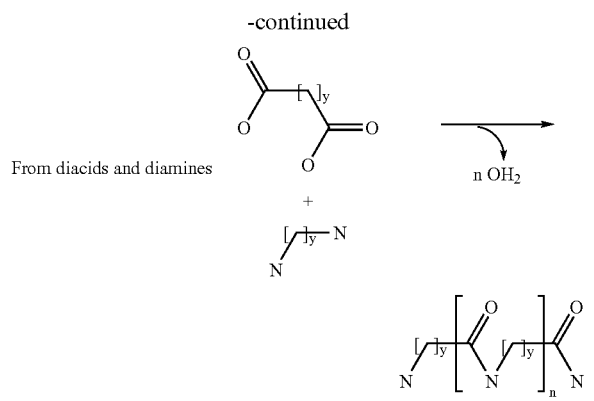

From diacids and diamines

In other embodiments, Applicants' method is used to prepare polyesters. In certain embodiments, Applicants' method uses acid/alcohol precursors. In certain embodiments, Applicants' method utilizes a mixture of diacids and diols. Reaction Pathway II summarizes the chemistry used to prepare polyesters using Applicants' method. In other embodiments, Applicants' method is used to prepare polyesters. In certain embodiments, Applicants' method uses acid/alcohol precursors. In certain embodiments, Applicants' method utilizes a mixture of diacids and diols. Reaction Pathway II summarizes the chemistry used to prepare polyesters using Applicants' method.

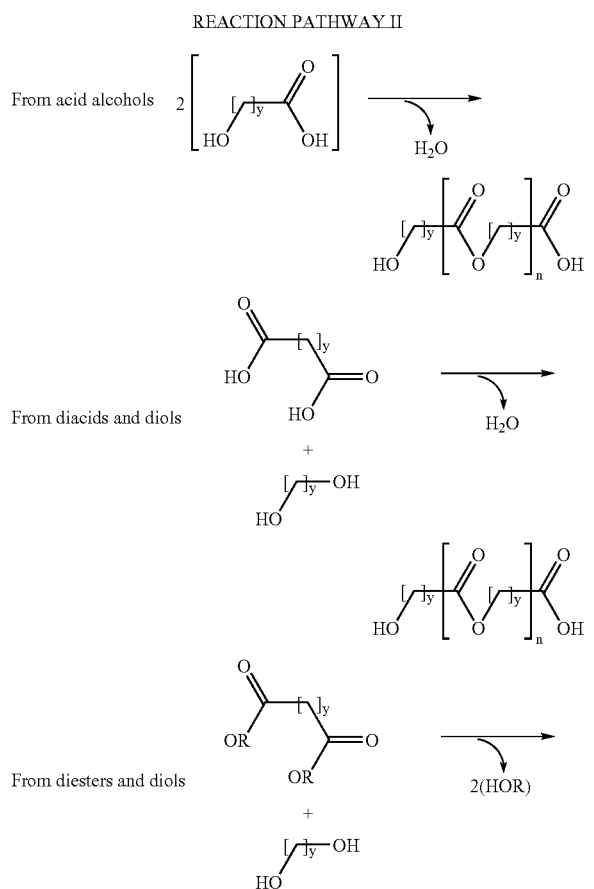

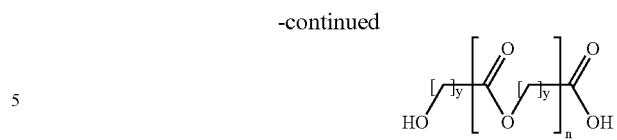

Applicants' method includes forming a suspension of monomer in a water immiscible liquid. The water immiscible liquid material is selected such that the water various monomer(s) are substantially insoluble. In certain embodiments, the water immiscible liquid material comprises a single component. In certain embodiments, the water immiscible liquid material comprises more than one component.

In certain embodiments, the water immiscible liquids are selected from those conventionally used for reverse polymerization such as aliphatic, aromatic or naphthenic hydrocarbon solvent or oils, chlorinated hydrocarbons and aromatic or higher aliphatic esters such as fatty glycerides, dibutyl phthalate and di-octylphthalate. Mixtures may be used. The liquids are inert, non-solvents for the water soluble polymers produced. In certain embodiments, the water immiscible liquid component includes 1,1,2,2-tetrachloroethylene, 1,2-dibromoethane, 2-chloroethanol, ethylene carbonate, isopentyl alcohol, diethylene glycol monomethyl ether, 1,2,4-trichlorobenzene, bromobenzene, dichlorobenzene, cyclohexanol, diethylene glycol monoethyl ether, benzonitrile, ethyl benzene, diphenyl ether, m,o, p-xylenes, octane, diethylene glycol diethyl ether, triethylene glycol dimethyl ether, naphthalene, decane, and mixtures thereof.

In certain embodiments, Applicants' method includes adding one or more emulsifiers to the reaction mixture prior to refluxing. In certain embodiments, those one or more emulsifiers are present in an amount between about 0.0 wt. % and about 30 wt. %. In certain embodiments, the one or more emulsifiers are present in an amount between about 0.1 wt. % and about 15 wt. %. In certain embodiments, the one or more emulsifiers are present in an amount between about 0.2 wt. % and about 5 wt. %.

In certain embodiments, the one or more emulsifiers are selected from the group consisting of hydroxypropyl cellulose, ethyl cellulose, methyl cellulose, cellulose acetate, butyrate ether blend, copolymers of ethylene and vinyl acetate, polyoxyethylene sorbitan, mono-oleates, laurates, stearates, cetyl dimethicone copolyol, polyglyceryl-4-isostearate, hexyl laurate, sorbitan monostearate, and sorbitan monooleate.

In certain embodiments, Applicants' method includes adding one or more antioxidants to the reaction mixture. In certain embodiments, the one or more antioxidants are added in an amount between about 0.01 wt. % and about 10 wt. %. In certain embodiments, the one or more antioxidants are added in an amount between about 0.1 wt. % and about 5 wt. %. In certain embodiments, the one or more antioxidants are added in an amount between about 0.5 wt. % and about 1 wt. %.

In certain embodiments, the one or more antioxidants include n-octadecyl-3-(3,5-di-t-butyl-4-hydrox, n-octadecyl-4-(3,5-di-t-butyl-4-hydroxyphenyl)butyrate, n-hexyl-3,5-di-t-butyl-4-hydroxyphenylpropionate, n-dodecyl-3,5-di-t-butyl-4-hydroxyphenylpropionate neo-dodecyl-3-(3,5-di-t-butyl-4-hydro, ethyl-.alpha.-(4-hydroxy-3,5-di-t-butylphenyl)-isobutyrate, octadecyl-.alpha.-(4-hydroxy-3,5-di-t-buty, 1,2-propylene glycol bis-{3-(3,5-di-t-butyl-4-hydroxyphenyl), 2-stearoyloxyethyl-7-(3-methyl-5-t-butyl- 4-hydroxyphenyl)heptanoate, 1,6-n-hexanediol-bis{(3',5'-di-t-butyl-4-hydroxyphenyl)propionate}, di-n-octadecyl-.alpha.-(3,5-di-t-butyl-4-hydroxybenzyl)malonate, di-n-octadecyl-.alpha.-(3-t-butyl-4-hydroxy-5-methyl-benzyl)malonate, di-n-octadecyl-,.alpha.'-bis-(3-t-butyl-4-hydroxy-5-methylbenzyl)malonate, di-n-octadecyl-3,5-di-t-butyl-4-hydroxybenzylphosphonate, di-n-octadecyl-1-(3,5-di-t-butyl-4-hydroxyphenyl)-ethanephosphonate, di-n-tetradecyl-3,5-di-t-butyl-4-hydroxybenzylphosphonate, di-n-hexadecyl-3,5-di-t-butyl-4-hydroxybenzylphosphonate, di-n-dodecyl-3,5-di-t-butyl-4-hydroxybenzylphosphonate, tris-(3,5-di-t-butyl-4-hydroxybenzyl)isocyanurate, tris-(3-t-butyl-4-hydroxy-5-methylbenzyl)isocyanurate, and mixture thereof.

In certain embodiments, Applicants' method utilizes the comonomer mixture taught by Sikes et al. in U.S. Pat. No. 6,495,658. In one embodiment, Applicants' method is used to polymerize that monomer mixture using a reverse suspension polymerization. In a separate embodiment, Applicants' method is used to polymerize that monomer mixture using an emulsion polymerization. In either case, the product comprises the copoly(succinimide asparate) shown below.

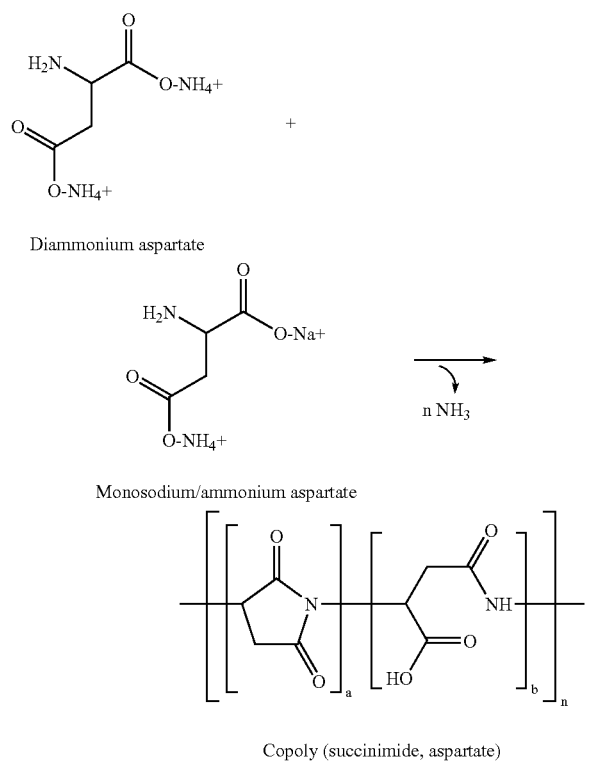

As an example, sodium/ammonium salts of L-aspartic acid are first suspended in an immiscible liquid material having a boiling range between about 75° C. and about 300° C. In certain embodiments, the immiscible liquid material has a boiling range between about 100° C. and about 250° C. In certain embodiments, the immiscible liquid material has a boiling range between about 140° C. and about 210° C. Upon heating the reaction mixture to the boiling point, water is continuously removed as it forms. The reaction can be run at
a range of pressure from full vacuum (0.1 mmHg) to high pressure up to 600 psig. Controlling the pressure of the reaction will in turn dictate the temperature of the reaction. Thus a high boiling solvent can be 'forced' to boil at a lower temperature keeping the reaction temperature low or a low boiling point solvent can be 'forced' to boil at a higher temperature under high pressure and increase the temperature of the reaction.

Applicants' method utilizes a constant reaction temperature, and thereby transfers heat uniformly to the reactants. Applicants have found that such uniform heat transfer decreases the incidence of color causing side reactions, increases the molecular weight of the polymer formed, and affords greater control of copolymer ratio (aspartate to succinimide).

Aspartic acid has been produced commercially since the 1980's via immobilized enzyme methods. The aspartic acid so produced mainly has been used as a component of the synthetic sweetener, N-aspartyl phenylalanine methyl ester (ASPARTAME®). In a typical production pathway, a solution of ammonium maleate is converted to fumarate via action of an immobilized enzyme, maleate isomerase, by continuous flow over an immobilized enzyme bed. Next, the solution of ammonium fumarate is treated also by continuous flow of the solution over a bed of the immobilized enzyme, aspartase. A relatively concentrated solution of ammonium aspartate is produced, which then is treated with an acid, for example nitric acid, to precipitate aspartic acid. After drying, the resultant product of the process is powdered or crystalline L-aspartic acid. Prior art that exemplifies this production pathway includes U.S. Pat. No. 4,560,653 to Sherwin and Blouin (1985), U.S. Pat. No. 5,541,090 to Sakano et al. (1996), and U.S. Pat. No. 5,741,681 to Kato et al. (1998).

In addition, nonenzymatic, chemical routes to D,L aspartic acid via treatment of maleic acid, fumaric acid, or their mixtures with ammonia at elevated temperature have been known for over 150 years (see Harada, K., Polycondensation of thermal precursors of aspartic acid. Journal of Organic Chemistry 24, 1662-1666 (1959); also, U.S. Pat. No. 5,872,285 to Mazo et al. (1999)). Although the nonenzymatic routes are significantly less quantitative than the enzymatic syntheses of aspartic acid, possibilities for continuous processes and recycling of reactants and by-products via chemical routes are envisioned.

As reviewed in U.S. Pat. No. 6,495,658 to Sikes et al., polymerization and copolymerization of aspartic acid alone or with other comonomers is known. Synthetic work with polyamino acids, beginning with the homopolymer of aspartic acid, dates to the mid 1800's and has continued to the present. Interest in polyaspartates and related molecules increased in the mid 1980's as awareness of the commercial potential of these molecules grew. Particular attention has been paid to biodegradable and environmentally compatible polyaspartates for commodity uses such as detergent additives and superabsorbent materials in disposable diapers, although numerous other uses have been contemplated, ranging from water-treatment additives for control of scale and corrosion to anti-tartar agents in toothpastes.

There have been some teachings of producing copolymers of succinimide and aspartic acid or aspartate via thermal polymerization of maleic acid plus ammonia or ammonia compounds. For example, in U.S. Pat. No. 5,548,036 Kroner et al teach that polymerization at less than 140° C. results in aspartic acid residue-containing polysuccinimides. However, the reason that some aspartic acid residues persisted in the product polymers was that the temperatures of polymerization were too low to drive the reaction to completion, leading to inefficient processes.

In JP 8277329 (1996), Tomida teaches the thermal polymerization of potassium aspartate in the presence of 5 mole % and 30 mole % phosphoric acid. The purpose of the phosphoric acid was stated to serve as a catalyst so that molecules of higher molecular weight might be produced. However, the products of the reaction were of lower molecular weight than were produced in the absence of the phosphoric acid, indicating that there was no catalytic effect. There was no mention of producing copolymers of aspartate and succinimide; rather, there was mention of producing only homopolymers of polyaspartate. In fact, addition of phosphoric acid in this fashion to form a slurry or intimate mixture with the powder of potassium aspartate, is actually counterproductive to formation of copolymers containing succinimide and aspartic acid residue units, or to formation of the condensation amide bonds of the polymers in general. That is, although the phosphoric acid may act to generate some fraction of residues as aspartic acid, it also results in the occurrence of substantial amounts of phosphate anion in the slurry or mixture. Upon drying to form the salt of the intimate mixture, such anions bind ionically with the positively charged amine groups of aspartic acid and aspartate residues, blocking them from the polymerization reaction, thus resulting in polymers of lower molecular weight in lower yield.

In U.S. Pat. No. 5,371,180, Groth et al. (1994) teach production of copolymers of succinimide and aspartate by thermal treatment of maleic acid plus ammonium compounds in the presence of alkaline carbonates. The invention involved an alkaline, ring-opening environment of polymerization such that some of the polymeric succinimide residues would be converted to the ring-opened, aspartate form. For this reason, only alkaline carbonates were taught and there was no mention of cations functioning themselves in any way to prevent imide formation.

More recently, in U.S. Pat. No. 5,936,121 Gelosa et al. (1999) teach formation of oligomers (Mw<1000) of aspartate having chain-terminating residues of unsaturated dicarboxylic compounds such as maleic and acrylic acids. These aspartic-rich compounds were formed via thermal condensation of mixtures of sodium salts of maleic acid plus ammonium/sodium maleic salts that were dried from solutions of ammonium maleate to which NaOH had been added. They were producing compounds to sequester alkaline-earth metals. In addition, the compounds were shown to be nontoxic and biodegradable by virtue of their aspartic acid composition. Moreover, the compounds retained their biodegradability by virtue of their very low Mw, notwithstanding the presence of the chain-terminating residues, which when polymerized with themselves to sizes above the oligomeric size, resulted in non-degradable polymers.

A number of reports and patents in the area of polyaspartics (i.e., poly(aspartic acid) or polyaspartate), polysuccinimides, and their derivatives have appeared more recently. Notable among these, for example, there have been disclosures of novel superabsorbents (U.S. Pat. No. 5,955,549 to Chang and Swift, 1999; U.S. Pat. No. 6,027,804 to Chou et al., 2000), dye-leveling agents for textiles (U.S. Pat. No. 5,902,357 to Riegels et al., 1999), and solvent-free synthesis of sulfhydryl-containing corrosion and scale inhibitors (EP 0 980 883 to Oda, 2000). There also has been teaching of dye-transfer inhibitors prepared by nucleophilic addition of amino compounds to polysuccinimide suspended in water (U.S. Pat. No. 5,639,832 to Kroner et al., 1997), which reactions are inefficient due to the marked insolubility of polysuccinimide in water.

U.S. Pat. No. 5,981,691 teaches mixed amide/imide, water-soluble copolymers of aspartate and succinimide for a variety of uses. The concept therein was that a monocationic salt of aspartate when formed into a dry mixture with aspartic acid could be thermally polymerized to produce the water-soluble copoly(aspartate, succinimide). The theory was that the aspartic acid comonomer when polymerized led to succinimide residues in the product polymer and the monosodium aspartate comonomer led to aspartate residues in the product polymer. It was not recognized that merely providing the comonomers was not sufficient to obtain true copolymers and that certain other conditions were necessary to avoid obtaining primarily mixtures of polyaspartate and polysuccinimide copolymers. In U.S. Pat. No. 5,981,691, the comonomeric mixtures were formed from an aqueous slurry of aspartic acid, adjusted to specific values of pH, followed by drying. There was no teaching of use of solutions of ammonium aspartate or any other decomposable cation plus NaOH, or other forms of sodium or other cations, for generation of comonomeric compositions of aspartic acid and salts of aspartate. Thus, although some of the U.S. Pat. No. 5,981,691 examples obtain products containing some copolymer in mixture with other products, particularly homopolymers, the theory that true copolymers could be obtained merely by providing the comonomers in the manner taught in U.S. Pat. No. 5,981,691 was not fully realized.

It is now known that the methods taught in U.S. Pat. No. 5,981,691, or in any of the other discussed references, fail to provide an efficient process to produce a true mixed amide/imide polyamino acid copolymer, a copolymer prepared by such process or other novel copolymers. These previous references fail to teach a method whereby a sufficiently intimate mixture of the comonomers is provided such that polymerization leads to a true copolymer with a significant number of both aspartate and succinimide residues. For example, the above-described method of U.S. Pat. No. 5,981,691 purportedly for producing such copolymers results, instead in a mixture, albeit intimate mixture, of aspartic acid (amide) and succinimide (imide) homopolymers, possibly with an amount of copolymer, unappreciated by the reference, mixed therein.

U.S. Pat. No. 6,495,658 teaches a method to provide a mixture of comonomers which allows the production of a true copolymer with a significant number of both aspartate (also referred to as amide) residues or units and succinimide (also referred to as imide) units or residues. That method includes providing an intimate solution of an aspartate of a non-volatile cation and an aspartate of a volatile cation. By the term aspartate is meant an aspartic acid residue, either as a monomer or as a polymerized or copolymerized unit having its carboxyl group in ionic form associated with a cation, i.e., as —COO$^-$. Specifically, for example, an ammonium aspartate solution can be titrated with NaOH to a fractional molar equivalence of a sodium salt of aspartate and an ammonium salt of aspartate. This comonomeric solution is then dried to produce a comonomer mixture of a partial sodium salt of aspartic acid and free aspartic acid. By free aspartic acid is meant aspartic acid or a polymerized or copolymerized aspartic acid residue having its carboxyl group not in ionic form, i.e., as —COOH. Because the dried comonomer mixture is prepared from the novel intimate solution of comonomers, an intimate dried mixture of these comonomers is obtained. Sikes et al. teach that the mixture is intimate to the extent of exhibiting a salt lattice structure of the aspartate with the aspartic acid. Further according to Sikes, et al., it is possible for the dried comonomeric composition to also contain some residual ammonium aspartate, but in very small amounts, e.g., not exceeding 5% by weight, preferably not exceeding 2% by weight.

The following examples are presented to further illustrate to persons skilled in the art how to make and use the invention and to identify presently preferred embodiments thereof. These examples are not intended as limitations, however, upon the scope of Applicants' invention, which is defined by the appended claims.

EXAMPLE I

Reverse Suspension Polymerization a. A mixture of Sikes et al. co-monomer (83 g), naphtha 200 mL (bp 190-201° C.), and Sorbitan monostearate (12 g) was stirred in a 3 Liter, 4-neck resin kettle using mechanical stirring, a Dean-Stark trap, a condenser, and a collection vessel for the water removed from the reaction mixture.
b. When the temperature reached 174° C. (inside temp), a constant reflux and water collection was observed.
c. At approximately 190° C., 15 mL of water was collected in the Dean-Stark (~16 mL theoretical).
d. The temperature was increased to 200° C. to maintain a constant reflux of naphtha, with no additional water collection.
e. Heating was continued for approximately 1 hour and then the reaction was shut down.
f. The final product, a light brown solid, was filtered and dried in the vacuum oven at 100° C. for 24 hours.

EXAMPLE II

Reverse Suspension Polymerization

A mixture of Adipic acid (100 g) and m-Xylene Diamine (97.7), naphtha 200 mL (bp 190-201° C.), and Sorbitan monostearate (12 g) was stirred in a 3 Liter, 4-neck resin kettle using mechanical stirring, a Dean-Stark trap, a condenser, and a collection vessel for the water removed from the reaction mixture.
b. When the temperature reached 174° C. (inside temp), a constant reflux and water collection was observed.
c. At approximately 198° C., 23 mL of water was collected in the Dean-Stark (~23 mL theoretical).
d. The temperature was increased to 200° C. to maintain a constant reflux of naphtha, with no additional water collection.
e. Heating was continued for approximately 1 hour and then the reaction was shut down.
g. The final product, a white powder, was filtered and dried in the vacuum oven at 100° C. for 24 hours.

EXAMPLE III

Reverse EmulsionPolymerization a. About 200 mL of a 1:1 sodium/ammonium salt: diammonium salt solution (30% solids), 400 mL of naphtha (bp 190-201° C.), and 3 g of Sorbitan monostearate, were stirred in a 3L resin kettle using the apparatus recited above.
b. Droplets of water began to collect in the Dean-Stark trap when the reaction reached 100° C.
c. After approximately 3.5 hours 140 mL of water (the amount of free water present in the stock solution) were collected in the trap (maximum temperature of 113° C.).
d. After all the free water was collected, the temperature began to increase and after reaching approximately 130° C. the water from reaction was observed.
e. A white solid mixture began to turn light yellow in color at 171° C. and the stirring became a little strained (the RPM's had to be decreased to prevent seizing of the motor).
f. As the temperature increased the water collection began to decrease, and at 201° C. the collection ceased.
g. This temperature was maintained for an additional hour with no observable water collection, and then the reaction was shut down and allowed to cool under a nitrogen atmosphere.
h. The light orange solid was then filtered and dried in the vacuum oven at 100° C., 30" for 24 hours.

EXAMPLE IV

Reverse EmulsionPolymerization a. A solution was made consisting of 100 grams of Adipic acid, 97.7 grams of m-Xylene Diamine and 100 mL of water were added to 400 mL of naphtha (bp 190-201° C.), and 3 g of Sorbitan monostearate, were stirred in a 3L resin kettle using the apparatus recited above.
b. Droplets of water began to collect in the Dean-Stark trap when the reaction reached 100° C.
c. After approximately 3.5 hours 980 mL of water (the amount of free water present in the stock solution) were collected in the trap (maximum temperature of 113° C.).
d. After all the free water was collected, the temperature began to increase and after reaching approximately 130° C. the water from reaction was observed.
e. As the temperature increased the water collection began to decrease, and at 201° C. the collection ceased.
g. This temperature was maintained for an additional hour with no observable water collection, and then the reaction was shut down and allowed to cool under a nitrogen atmosphere.
h. The white solid was then filtered and dried in the vacuum oven at 100° C., 30" for 24 hours.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to form a polymeric material, comprising the steps of:
providing a water immiscible solvent;
providing a condensation monomer, wherein said condensation monomer is essentially insoluble in said water immiscible solvent, and wherein said condensation monomer is a solid at room temperature;
forming a reaction mixture comprising a suspension of said condensation monomer in said water immiscible solvent;
adding one or more emulsifiers to said reaction mixture prior to heating said reaction mixture;
adding one or more antioxidants to said reaction mixture prior to heating said suspension;

heating said reaction mixture;

collecting said polymeric material from said reaction mixture.

2. The method of claim 1, further comprising the steps of:

reacting a first molecule of said condensation monomer with a second molecule of said condensation monomer to form a plurality of dimer molecules and a plurality of water molecules;

removing said plurality of water molecules from said reaction mixture.

3. A method to form a polymeric material, comprising the steps of:

providing naphtha having a boiling point between about 190° C. and about 201° C. at ambient pressure;

providing an equimolar mixture of adipic acid and m-xylene diamine;

forming a reaction mixture comprising a suspension of said equimolar mixture of adipic acid and m-xylene diamine in said naphtha;

heating said reaction mixture to an internal temperature of about 174° C.;

removing water from said reaction mixture;

increasing said internal temperature to about 200° C.;

cooling said reaction mixture to room temperature; and collecting said polymeric material from said reaction mixture.

4. A method to form a polymeric material, comprising the steps of:

providing naphtha having a boiling point between about 190° C. and about 201° C. at ambient pressure;

providing a mixture of diammonium aspartate and monosodium/ammonium aspartate;

dispersing said monomer mixture in said naphtha to form a reaction mixture comprising a suspension;

heating said reaction mixture to about 174° C.;

removing water from said reaction mixture;

cooling said reaction mixture to room temperature; and collecting said polymeric material from said reaction mixture.

5. The method of claim 4, wherein said providing a mixture of diammonium aspartate and monosodium/ammonium aspartate step further comprises providing a monomer mixture comprising about equimolar amounts of diammonium aspartate and monosodium/ammonium aspartate.

6. The method of claim 5, further comprising the step of adding sorbitan monostearate to said reaction mixture prior to heating said reaction mixture.

7. A method to form a polymeric material, comprising the steps of:

providing a water immiscible solvent;

providing a solution comprising about (M) moles of diammonium aspartate and about (M) moles of sodium/ammonium asparate in about (N) mL of water, wherein solution is essentially insoluble in said water immiscible solvent;

forming a reaction mixture comprising an emulsion comprising said solution and said water immiscible solvent;

heating said reaction mixture to an internal temperature of about 100° C.;

removing said (N) mL of water from said reaction mixture;

increasing said internal temperature to about 130° C.;

removing about (M) moles of water from said reaction mixture;

forming a white colored precipitate;

increasing said internal temperature to about 171° C.;

forming a yellow-colored precipitate;

cooling said reaction mixture to room temperature under a nitrogen atmosphere to form an orange-colored polymeric material; and precipitating said polymeric material from said reaction mixture.

8. A method to form a polymaterial, comprising the steps of:

providing a water immiscible solvent;

providing a solution comprising about (M) moles of adipic acid and about (M) moles of m-xylene diamine in about (N) mL of water, wherein said solution is essentially insoluble in said water immiscible solvent;

forming a reaction mixture comprising an emulsion comprising said solution and said water immiscible solvent;

heating said reaction mixture to an internal temperature of about 100° C.;

removing said (N) mL of water from said reaction mixture;

increasing said internal temperature to about 130° C.;

removing about (M) moles of water from said reaction mixture;

forming a white colored precipitate;

increasing said internal temperature to about 201° C.;

cooling said reaction mixture to room temperature under a nitrogen atmosphere;

precipitating said polymeric material from said reaction mixture; and collecting said polymeric material.

* * * * *